US008189764B2

(12) United States Patent
Tagane et al.

(10) Patent No.: US 8,189,764 B2
(45) Date of Patent: May 29, 2012

(54) SERVER FOR TRANSFERRING A COMMUNICATION MESSAGE

(75) Inventors: Junji Tagane, Fukuoka (JP); Ryuji Oda, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1143 days.

(21) Appl. No.: 12/029,906

(22) Filed: Feb. 12, 2008

(65) Prior Publication Data

US 2008/0205607 A1 Aug. 28, 2008

(30) Foreign Application Priority Data

Feb. 26, 2007 (JP) ................................ 2007-045419

(51) Int. Cl.
*H04M 3/00* (2006.01)
*H04M 5/00* (2006.01)
(52) U.S. Cl. ..................................... 379/273; 379/93.01
(58) Field of Classification Search ................ 379/93.01, 379/273
See application file for complete search history.

(56) References Cited

U.S. PATENT DOCUMENTS

2002/0141404 A1 10/2002 Wengrovitz
2003/0174648 A1* 9/2003 Wang et al. .................... 370/235

FOREIGN PATENT DOCUMENTS

JP 2002335267 11/2002
JP 2005072817 3/2005

* cited by examiner

*Primary Examiner* — Alexander Jamal
(74) *Attorney, Agent, or Firm* — Katten Muchin Rosenman LLP

(57) ABSTRACT

A SIP server 100 includes a first memory 20 storing a route management table in which, of route set information specified by a SIP signal on a session-by-session basis, address information as of each Record-Route header value is associated with a logical number, the same address information as of a Record-Route header values being set to the same single logical number; and a second memory 30 storing session information other than the address information as of each Record-Route header value, instance management information for use in session control, and logical numbers. The address information as of each Record-Route header value, which is stored in the first memory 20 is read on the basis of the logical numbers stored in the second memory 30.

4 Claims, 10 Drawing Sheets

| LOGICAL NUMBER index = | IP ADDRESS |
|---|---|
| 0 | "192.168.10.11" |
| 1 | "192.168.10.12" |
| 2 | "192.168.10.13" |
| 3 | "192.168.10.14" |
| 4 | "192.168.10.15" |
| • | • |
| • | • |
| • | • |

FIG. 2A

| SESSION #1 | | |
|---|---|---|
| ROUTE ON INITIATING SIDE | INITIATING UA #1 | "192.168.1.100" |
| | Proxy #1 | 0 |
| | Proxy #2 | 1 |
| ROUTE ON RECEIVING SIDE | Proxy #3 | 2 |
| | Proxy #4 | 3 |
| | RECEIVING UA #2 | "192.168.1.101" |

| SESSION #2 | | |
|---|---|---|
| ROUTE ON INITIATING SIDE | INITIATING UA #3 | "192.168.1.102" |
| | Proxy #5 | 4 |
| | Proxy #2 | 1 |
| ROUTE ON RECEIVING SIDE | Proxy #3 | 2 |
| | Proxy #4 | 3 |
| | RECEIVING UA #2 | "192.168.1.101" |

| SESSION #3 | | |
|---|---|---|
| ROUTE ON INITIATING SIDE | INITIATING UA #2 | "192.168.1.101" |
| | Proxy #4 | 3 |
| | Proxy #3 | 2 |
| ROUTE ON RECEIVING SIDE | Proxy #2 | 1 |
| | Proxy #1 | 0 |
| | RECEIVING UA #1 | "192.168.1.100" |

FIG. 2B

| SESSION #1 | | |
|---|---|---|
| ROUTE ON INITIATING SIDE | INITIATING UA #1 | "192.168.1.100" |
| | Proxy #1 | "192.168.10.11" |
| | Proxy #2 | "192.168.10.12" |
| ROUTE ON RECEIVING SIDE | Proxy #3 | "192.168.10.13" |
| | Proxy #4 | "192.168.10.14" |
| | RECEIVING UA #2 | "192.168.1.101" |

| SESSION #2 | | |
|---|---|---|
| ROUTE ON INITIATING SIDE | INITIATING UA #3 | "192.168.1.102" |
| | Proxy #5 | "192.168.10.15" |
| | Proxy #2 | "192.168.10.12" |
| ROUTE ON RECEIVING SIDE | Proxy #3 | "192.168.10.13" |
| | Proxy #4 | "192.168.10.14" |
| | RECEIVING UA #2 | "192.168.1.101" |

| SESSION #3 | | |
|---|---|---|
| ROUTE ON INITIATING SIDE | INITIATING UA #2 | "192.168.1.101" |
| | Proxy #4 | "192.168.10.14" |
| | Proxy #3 | "192.168.10.13" |
| ROUTE ON RECEIVING SIDE | Proxy #2 | "192.168.10.12" |
| | Proxy #1 | "192.168.10.11" |
| | RECEIVING UA #1 | "192.168.1.100" |

FIG. 7B

SERVER FOR TRANSFERRING A COMMUNICATION MESSAGE

BACKGROUND OF THE INVENTION

1. Field of the Invention

The present invention relates to Internet protocol (IP) telephony servers configured to manage and control telephone communication performed via IP networks, and more particularly, to a Session Initiation Protocol (SIP) server that uses SIP as a protocol for initiating, changing, and terminating multimedia sessions over IP networks.

2. Description of the Related Art

SIP is a protocol proposed by the Internet Engineering Task Force (IETF) SIP Working Group and standardized in the Request for Comments (RFC) 3261. Over a network using SIP, among user agents (referred to as "UAs"), communication is performed between a user agent client (hereafter referred to as a "UAC") initiating a call and a user agent server (hereinafter referred to as a "UAS") receiving the call via a plurality of proxy servers.

FIG. 6 is a sequence diagram illustrating an exemplary message sequence for describing information regarding a route set in compliance with RFC 3261. Referring to FIG. 6, it is assumed that communication between a UAC and a UAS is performed via server B, server M, and server Y. SIP header names are abbreviated as "RURI" for Request-URI (Uniform Resource Identifier), "RR" for Record-Route, "C" for Contact, and "R" for Route.

An INVITE request, serving as an initial SIP signal, has Record-Route header fields for recording address information of servers via which the INVITE request traverses and a Contact header field containing address information of the initiating endpoint UA. A route header field is constructed from header values of the Record-Route headers and the Contact header. A rule has been adopted in RFC 3261 in which subsequent requests are transferred in accordance with the header values of the Route header. According to the rule, the route information, established by the INVITE request serving as the initial SIP signal, included in the Record-Route header fields should not be changed in subsequent SIP signals and a route set including the header values of the Record-Route headers and the Contact header should be held in a UA.

In this manner, the UAC initiates a request for session establishment using a SIP message, and the request is then routed by SIP servers acting as proxies to the UAS. A response from the UAS is sent via the SIP servers to the UAC. Accordingly, a call session in IP telephony is established.

According to RFC 3261, a SIP server performing proxy processing is not required to manage route set information. Actually, however, a requirement does exist for the SIP server to terminate a session. In particular, there are two types of SIP server configuration: proxy type and back-to-back user agent (B2BUA) type. A B2BUA SIP server must manage route set information in order to act as a UA. A proxy SIP server, which is not required originally to manage route set information, may sometimes be required to manage route set information as needed in such a case the SIP server is required to terminate a session. Accordingly, a typical SIP server, regardless of whether acting as a proxy or a B2BUA, is required to manage route set information on a session-by-session basis, secures a memory area for storing route set information on a session-by-session basis, and stores route set information within the SIP server.

For example, a typical SIP server receives an INVITE request, determines an address of an endpoint UA serving as a receiving party in accordance with basic routing information included in a header field and additional initiator information included in a body, and routes a session to the address determined (for example, see Japanese Unexamined Patent Publication No. 2002-335267).

A typical SIP server notifies a Voice-over IP (VoIP)-address translation apparatus of address translation information on a call-by-call basis. The address translation apparatus translates address information included in a SIP message from an IP address for a private IP network to an IP address for a global IP network and vice versa. In the case of communication between IP telephone terminals connected to the same private IP network, the set-up is done to enable direct communication between the terminals via a single address translation apparatus. In the case of communication between terminals connected over a plurality of private IP networks, the set-up is done to enable direct communication between the terminals via a single address translation apparatus or communication between the terminals via a global network using a plurality of address translation apparatuses in a cooperative manner (for example, see Japanese Unexamined Patent Application Publication No. 2005-72817).

A UA is only required originally to manage route set information for the number of sessions to join (although only one session in a general telephone communication, there is no problem to join a plurality of sessions). If a SIP server is configured to manage route set information on a session-by-session basis in its internal memory, the SIP server is required to store route set information for the maximum number of connections at one time.

FIG. 7A is a diagram illustrating an example of telephone communications performed via plurality of SIP servers. As shown in FIG. 7A, it is assumed that telephone communications are performed around a SIP server 100 (referred to as an observed server) between two UAs among a first UA 201 (UA #1 with IP address "192.168.1.100"), a second UA 202 (UA #2 with IP address "192.168.1.101"), and a third UA 203 (UA #3 with IP address "192.168.1.102") via proxy servers including a first proxy server 101 (Proxy #1 with IP address "192.168.10.11"), a second proxy server 102 (Proxy #2 with IP address "192.168.10.12"), a third proxy server 103 (Proxy #3 with IP address "192.168.10.13"), a fourth proxy server 104 (Proxy #4 with IP address "192.168.10.14"), and/or a fifth proxy server 105 (Proxy #5 with IP address "192.168.10.15"). It is also assumed that route information is stored in each SIP server in this example. In FIG. 7A, a solid line represents a route of session #1, a broken line represents a route of session #2, and a dotted-chain line represents a route of session #3.

FIG. 7B is a diagram illustrating exemplary route set information stored in the observed server shown in FIG. 7A. In the case where three sessions are established via the observed server 100, as shown in FIG. 7B, character strings indicating address information included in each of route set information of session #1, session #2, and session #3 are managed in a memory of the SIP server 100. Although IP addresses are shown in FIGS. 7A and 7B, fully qualified domain name (FQDN) addresses which can be resolved in a domain name system (DNS) may similarly be used.

More specifically, it is assumed that a SIP server that can allow simultaneous connections of a hundred thousand sessions uses four Record-Route headers per session, and the size of one address data is 256 bytes, which is the general size of the address data. In this case, the amount of memory necessary for managing entire route set information in the SIP server is (Contact header×2+Record-Route header×4)×the maximum number of simultaneous connections, which is calculated as (265 bytes×2+256 bytes×4)×100,000 sessions 1.54 Mbytes. That is, a total of 154-Mbyte memory is necessary. For each session, a 1.54-kbyte memory is necessary to be secured. Further, as the number of Record-Route headers increases, so does the amount of memory required. Since it is necessary to rescue calls during communication, this memory needs to be secured not in a heap area, but in a common memory area.

In particular, to use an active SIP server (hereinafter referred to as an ACT-SIP server) and a standby SIP server (hereinafter referred to as an SBY-SIP server) in combination as a redundantly configured server (hereinafter referred to as an ACT/SBY server), it is necessary to transfer route set information from the ACT-SIP server to the SBY-SIP server before a failure occurs in the ACT-SIP server in order to rescue sessions during switching from the ACT-SIP server to the SBY-SIP server.

A typical SIP server is required to have a high-capacity internal memory (in the above-described specific example, a memory area for recording only route set information requires 156 Mbytes).

In particular, in the case of implementation of the SIP server in redundant configuration (e.g., an ACT/SBY server) for the purpose of ensuring high reliability of IP telephony servers, a memory area required for rescuing sessions must be taken over from the ACT-SIP server to the SBY-SIP server. This involves the memory transfer processing between the ACT-SIP server and the SBY-SIP server during session control. Therefore, the larger the data area for managing route set information, the larger the amount of data transferred. In a highly loaded status, congestion of the SIP server occurs earlier, resulting in deterioration of the performance of the IP telephony servers.

If the memory area required for rescuing sessions exceeds an amount of one time transfer between the ACT-SIP server and the SBY-SIP server, the memory area must be divided into pieces and transferred piece by piece. This has an adverse effect on the performance of the IP telephony servers.

SUMMARY

In order to solve the above-described problems, it is an object of the present invention to provide a SIP server that reduces the amount of memory including route set information stored on a session-by-session basis in the server and suppresses congestion of the server.

It is another object of the present invention to provide a SIP server that reduces the amount of memory transferred between an ACT-SIP server and an SBY-SIP server in a redundantly configured server and to suppress congestion.

According to an aspect of the present invention, there is provided a server for transferring a communication message in a communication session, wherein the server is connected to a communication network. The server includes: a first storage which stores a logical number which is associated with address information of a proxy server which is connected to the communication network; a second storage which stores a logical number which is associated with session information for controlling a communication session; a receiver which receives a first communication message which includes first address information of a first proxy server; a session controller which generates first session information for controlling a first session which corresponds to the first communication message, extracts the first address information which is included in the first communication message, and stores in the second storage a first logical number which is associated with the first session information; and a route manager which retrieves the first logical number from the first storage on the basis of the first address information.

The session controller of the server may preferably extracts a second logical number from the second storage, and generates a second communication message which includes second address information. In such a configuration, the route manager retrieves the second address information from the first storage on the basis of the second logical number.

The server may further include: a third storage which stores information which is identical with information which is stored in the first storage; a fourth storage which stores information which is identical with information which is stored in the second storage; and a copier which copies information which is stored in the first storage to the third storage, and information which is stored in the second storage to the fourth storage.

In case that the communication session is a SIP session, the first communication message may be an INVITE request, and the first address information may be a header value of a Record-Route header.

BRIEF DESCRIPTION OF THE DRAWINGS

FIG. 2A is a diagram illustrating an exemplary route management table stored in a first memory of the SIP server shown in FIG. 1;

FIG. 2B is a diagram illustrating exemplary route information stored in a second memory of the SIP server shown in FIG. 1;

FIG. 7B is a diagram illustrating exemplary route set information stored in the observed server shown in FIG. 7A.

DESCRIPTION OF THE PREFERRED EMBODIMENTS

First Embodiment

Figure 1:
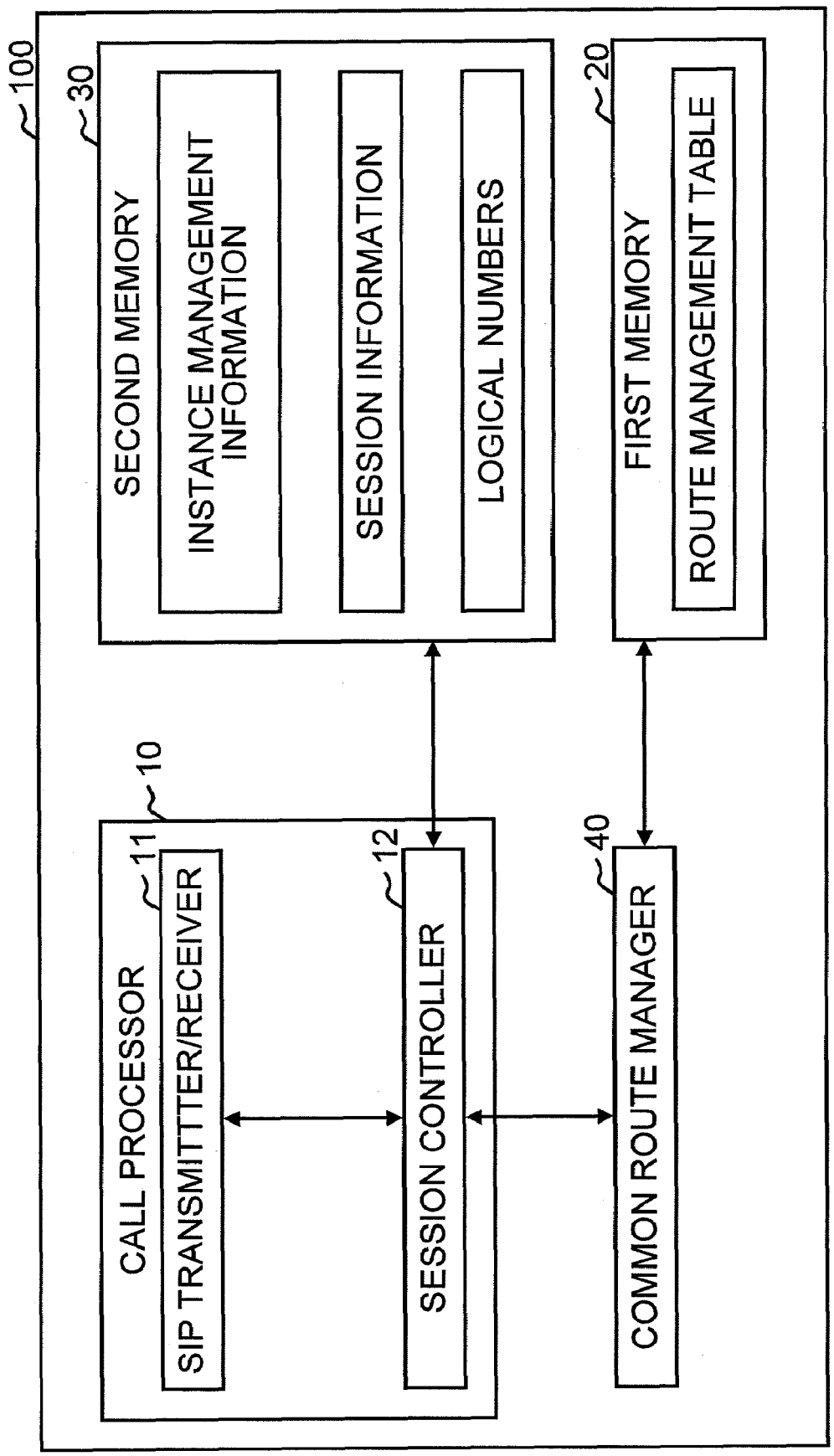
FIG. 1 is a block diagram illustrating a system configuration of a SIP server according to a first embodiment of the present invention.
Figure 3A:
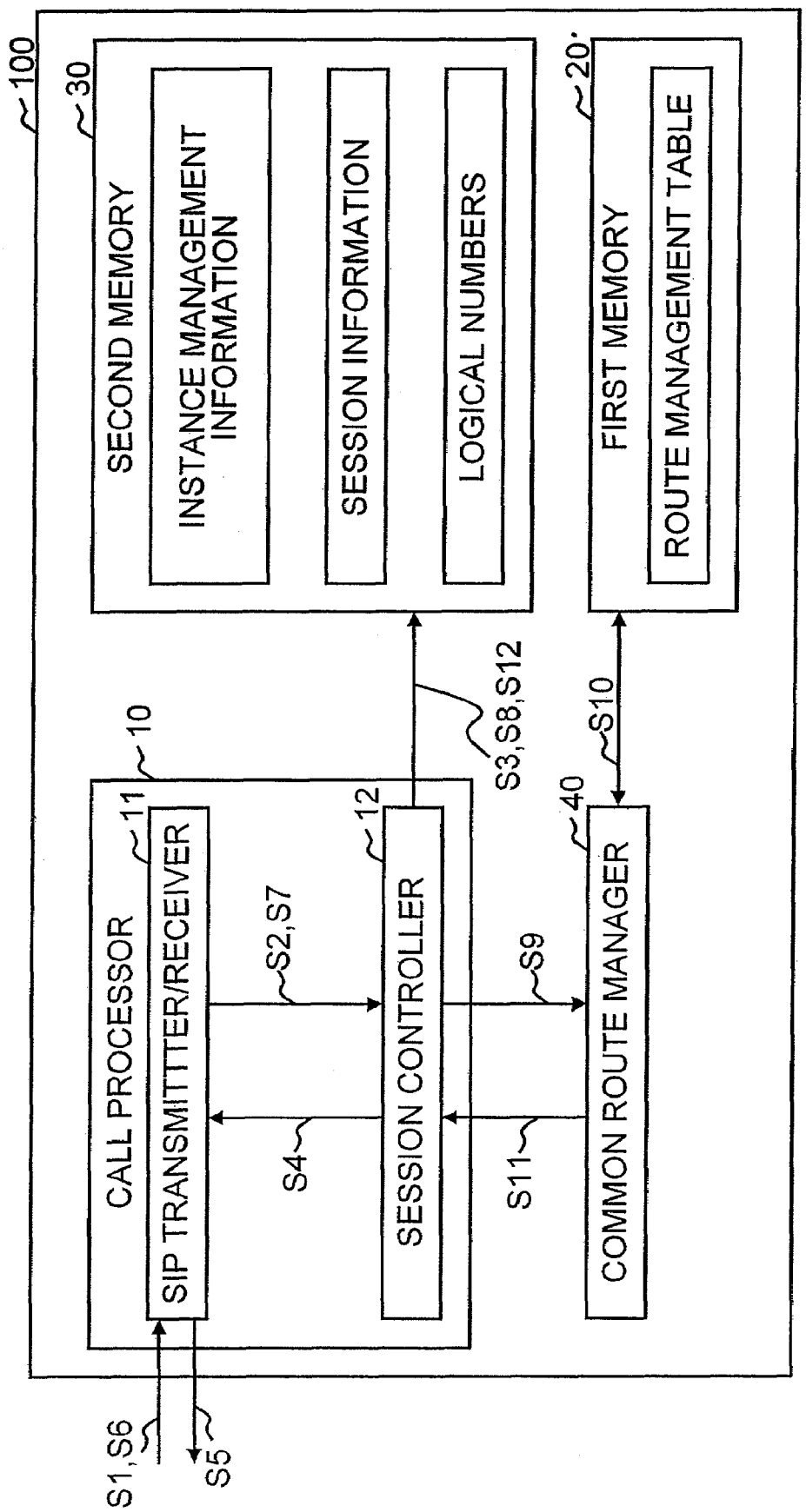
FIG. 3A is a block diagram illustrating a procedure of storing route set information performed by the SIP server shown in FIG. 1.
Figure 3B:
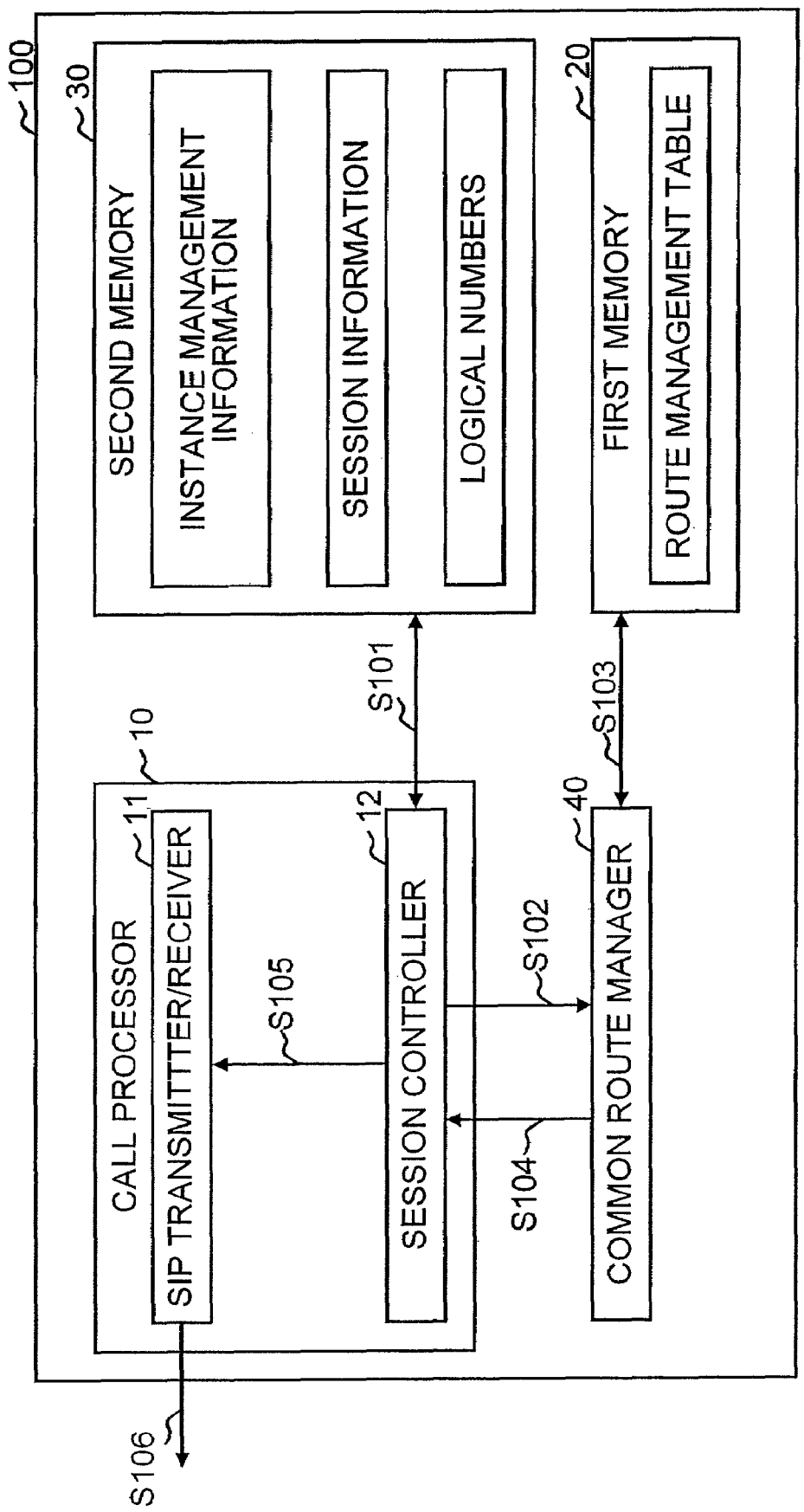
FIG. 3B is a block diagram illustrating a procedure of restoring route set information performed by the SIP server shown in FIG. 1.

FIG. 1 is a block diagram illustrating a system configuration of a SIP server according to a first embodiment of the present invention. FIG. 2A is a diagram illustrating an exemplary route management table stored in a first memory of the SIP server shown in FIG. 1. FIG. 2B is a diagram illustrating exemplary route information stored in a second memory of the SIP server shown in FIG. 1. FIG. 3A is a block diagram illustrating a procedure of storing route set information performed by the SIP server shown in FIG. 1. FIG. 3B is a block diagram illustrating a procedure of restoring route set information performed by the SIP server shown in FIG. 1.

Referring to FIG. 1, a call processor 10 of an observed server (SIP server 100) includes a SIP transmitter/receiver 11 for controlling transmission/reception of SIP signals to/from a server (hereinafter referred to as an opposing server) connected to the observed server and a session controller 12 for determining a destination address and controlling session statuses in response to receipt of SIP signals.

A first memory 20 stores a route management table in which, of route set information specified by a SIP signal on a session-by-session basis, address information as of each Record-Route header value is associated with a logical number in such manner that the same address information is set to the same logical number. In the route management table, as shown in FIG. 2A, a logical number and an IP address have a one-to-one correspondence. The logical number is a numeral represented in one byte, i.e. 0 to 255. The necessary number of the logical numbers is at least the number of IP addresses of proxy servers traversed between a UAC (initiating party) and a UAS (receiving party). Typically, thirty-two logical numbers at a maximum are necessary to handle IP addresses of proxy servers traversed between the UAC (initiating party) and the UAS (receiving party).

Figure 7A:
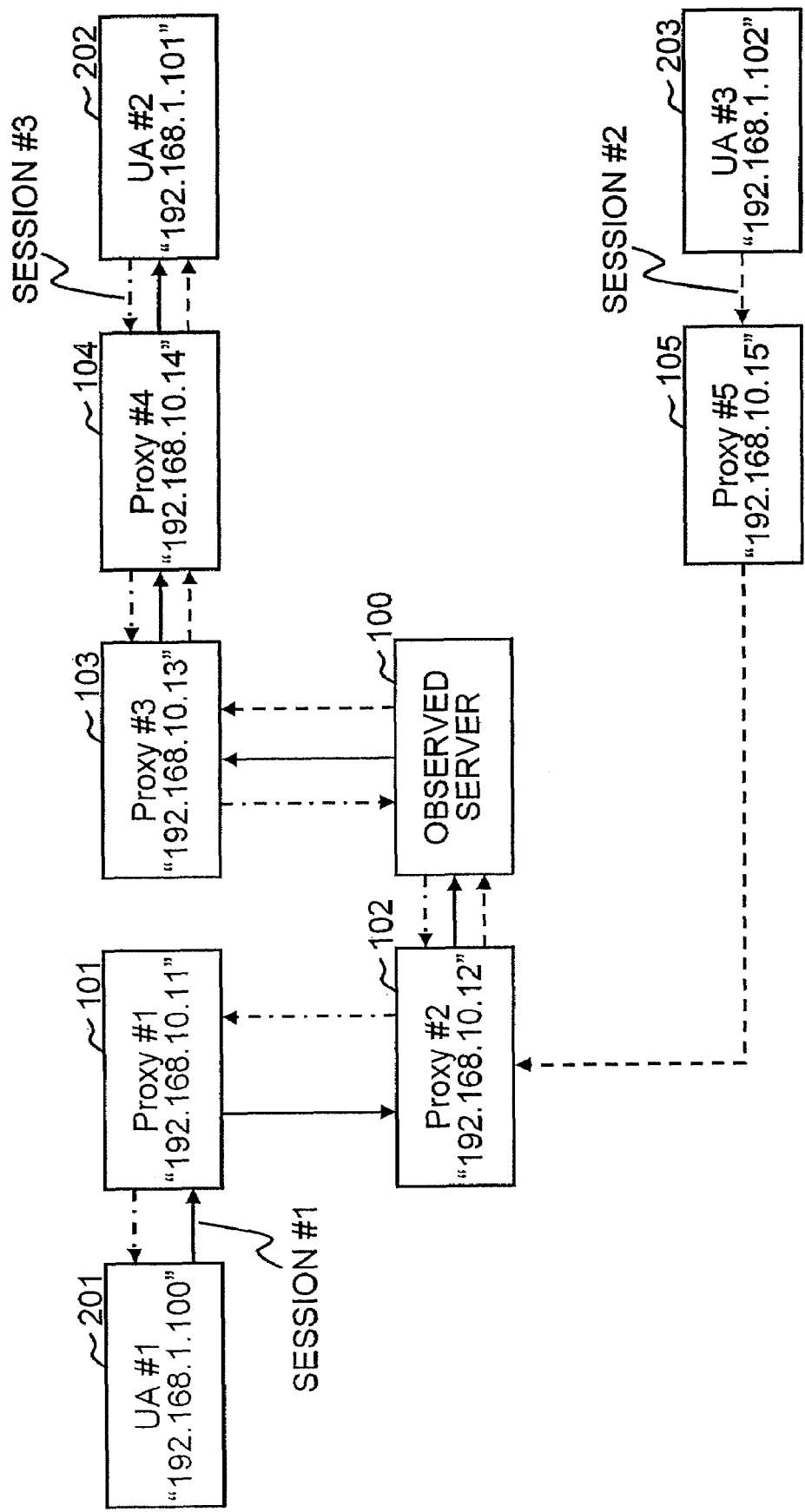
FIG. 7A is a diagram illustrating an example of telephone communications performed via plurality of SIP servers.

Here, as shown in FIG. 7A, it is assumed that telephone communication are performed around SIP server 100 (observed server) between two UAs among a first UA 201 (UA #1 with IP address "192.168.1.100"), a second UA 202 (UA #2 with IP address "192.168.1.101"), and a third UA 203 (UA #3 with IP address "192.168.1.102") via proxy servers including a first proxy server 101 (Proxy #1 with IP address "192.168.10.11"), a second proxy server 102 (Proxy #2 with IP address "192.168.10.12"), a third proxy server 103 (Proxy #3 with IP address "192.168.10.13"), a fourth proxy server 104 (Proxy #4 with IP address "192.168.10.14"), and/or a fifth proxy server 105 (Proxy #5 with IP address "192.168.10.15").

In the case where three sessions are established, as shown in FIG. 2B, logical numbers (numerals) associated with address information included in each of route set information of session #1, session #2, and session #3 are managed in the route management table stored in the first memory 20 of the SIP server 100. Although IP addresses are shown in FIGS. 2A and 2B, FQDN addresses which can be resolved in the DNS may similarly be used.

A second memory 30 stores session information including the route set information other than the address information as of each Record-Route header value (that is, address information as of each Contact header value) and information necessary for other session control, instance management information for use in session control, and the logical number associated with the address information as of each Record-Route header value.

Of the route set information, address information as of each Contact header value indicates address information of a UA and must be separately managed on a session-by-session basis, that is, address information as of Contact header values cannot be managed commonly in all sessions. Therefore, instead of being associated with a logical number, address information as of each Contact header value is stored as a character string in the second memory 30.

A common route manager 40 sets and reads the address information as of each Record-Route header value from the route management table and transfers the address information as of each Record-Route header value between the session controller 12 and the first memory 20.

Next, a procedure of storing route set information performed by the SIP server 100 will be described with reference to FIG. 3A.

In the SIP server 100 in normal operation, establishment and termination of a session are implemented by the call processor 10 for controlling session establishment by means of SIP signals.

When the SIP transmitter/receiver 11 receives a first SIP signal (hereinafter referred to as an initial-INVITE request) in the call processor 10 (step S1), the SIP transmitter/receiver 11 sends a notification indicating that the SIP signal has been received to the session controller 12 (step S2).

When the initial-INVITE request has been received, the session controller 12 generates an instance for performing session control, such as state management of a SIP session to be established, and performs session control such as address analysis with this instance.

The session controller 12 stores in the second memory 30 management information for this instance and session information which is necessary for session control, such as route set information (step S3).

The instance management information generated is registered in the SIP transmitter/receiver 11 associated with a Call-ID. Upon receipt of subsequent SIP signals in the session, the SIP transmitter/receiver 11 can uniquely specify the instance in the session controller 12 by using the Call-ID as key information.

After determining the address of an opposing server, the session controller 12 sends a request for SIP signal transmission to the SIP transmitter/receiver 11 (step S4) and the SIP transmitter/receiver 11 sends the initial-INVITE request to the address of the opposing server (step S5).

When a response to the initial-INVITE request (e.g., 183 Session Progress, 180 Ringing, 200 OK) or ACK is received by the SIP transmitter/receiver 11 (step S6), the call processor 10 sends to the session controller 12 a notification indicating that the SIP signal has been received (step S7).

The session controller 12 continuously controls responses and ACK with the instance generated to control relevant sessions upon receipt of the initial-INVITE request.

The session controller 12 reads header values of the Record-Route headers and the Contact header, namely route set information of the SIP signal and stores the address information as of the Contact header value in the second memory 30 (step S8).

The session controller 12 sends to the common route manager 40 a request for setting address information as of the Record-Route header values (step S9) and the common route manager 40 stores the address information as of the Record-Route header values in the first memory 20 (step S10).

The common route manager 40 determines whether the address information as of each Record-Route header value, which is transmitted from the session controller 12, has already been stored in the first memory 20. If the address information as of the Record-Route header value has not yet been stored in the first memory 20, the common route manager 40 stores the address information as of the Record-Route header value in a free area of the first memory 20 and sends an index value of this area as a logical number back to the session controller 12 (step S11). If the address information as of the Record-Route header value has already been stored in the first memory 20, the common route manager 40 sends back an index value corresponding to an area storing the address information, as a logical number to the session controller 12 (step S11).

The session controller 12 stores the sent back logical number as route set information in the second memory 30 (step S12).

Memorized information, such as the instance for controlling the session, is stored in the second memory 30 until the communication state of the session is terminated.

The first memory 20 is not initialized on a session-by-session basis. The first memory 20 continuously uses address information as of header values of accumulated Record-Route headers during the IP telephony operation. If the IP telephony operation cannot be recovered even by applying a restart phase according to the degree of influence of a system failure, the first memory 20 is initialized by the common route manager 40 at the time the initialization for restarting the SIP server 100 is performed.

According to the first embodiment, in the case where a logical number is assigned to address information as of each Record-Route header value, every time the common route manager 40 receives a request for setting the address information as of each Record-Route header value, the common route manager 40 assigns a sequential logical number. If address information of proxy servers traversed between UAs, which is to be included in Record-Route header fields, can be specified in advance, the first memory 20 may store in advance a route management table in which pieces of the specified address information of the proxy servers are associated with logical numbers.

In this case, the foregoing step S9 is changed to a step of sending a request for reading a logical number associated with address information as of each Record-Route header value to the common route manager 40. Further, the foregoing step S10 is changed to a step of reading the logical number associated with the address information as of each Record-Route header value from the first memory 20 by the common route manager 40.

According to the first embodiment, pieces of address information as of all Record-Route header values in all sessions are associated with logical numbers, and the pieces of address information as of the Record-Route header values and the logical numbers are stored in the first memory 20 and the second memory 30, respectively. Alternatively, however, until the amount of information to be stored in the second memory 30 exceeds the allowable memory amount (the number of servers traversed), the SIP server 100 may be kept running while address information as of each Record-Route header value is stored as a character string in the second memory 30 as in a typical SIP server. If the amount of information to be stored in the second memory 30 exceeds the allowable memory amount (the number of servers traversed), the common route manager 40 may be activated, the address information as of each Record-Route header value and its logical number may be stored in the first memory 20 and the second memory 30, respectively, and the session controller 12 may perform a control operation such that the SIP server 100 can be operated as has been described above.

Next, a procedure of restoring route set information performed by the SIP server 100 will be described with reference to FIG. 3B.

The session controller 12 refers to logical numbers included in route set information of the session which is stored in the second memory 30 (step S101).

On the basis of the logical numbers referred to, the session controller 12 sends a request to the common route manager 40 for reading address information as of Record-Route header values associated with the logical numbers (step S102).

The common route manager 40 reads the pieces of address information as of the Record-Route header values, which are stored in corresponding areas of the first memory 20, using the logical numbers referred to as indices (step S103), and sends back to the session controller 12 the pieces of address information as of the Record-Route header values (step S104).

Using the pieces of sent back address information as of the Record-Route header values and the memorized information stored in the second memory 30, the session controller 12 generates a SIP signal corresponding to processing such as termination of communication of the session.

Next, the session controller 12 sends a request for SIP signal transmission to the SIP transmitter/receiver 11 (step S105) and the SIP transmitter/receiver 11 sends the SIP signal to the address of the opposing server (step S106). Accordingly, the respective processing in the session can be performed.

As described above, the SIP server 100 according to the first embodiment of the present invention includes the common route manager 40 for managing route information of each session in common among all sessions. When a route (Record Routes and Contact) is established upon receipt of a response to the initial-INVITE request in each session, the common route manager 40 is notified of route information (Record-Route headers). The common route manager 40 assigns a logical number to address information as of each Record-Route header value and sends back the logical number. Accordingly, route set information stored in the SIP server 100 becomes unnecessary to be stored as a character string in the second memory 30 on a session-by-session basis, and it is only necessary to be stored as a logical number (numeral) assigned to address information as of each Record-Route header value. Therefore, the amount of memory required for storing route set information for managing a route set on a session-by-session basis can be reduced.

In particular, however a route set is established on a session-by-session basis, it can be estimated that most of the routes (servers included in the Record-Routes) traversed for establishing sessions in the same network include the same route (SIP server 100). Managing route information of each session in common among all sessions is effective in reducing the amount of memory needed since, in the case where the same server is included in routes in a plurality of sessions, it is only necessary to store one piece of address information of that server in the SIP server 100.

Second Embodiment

Figure 4:
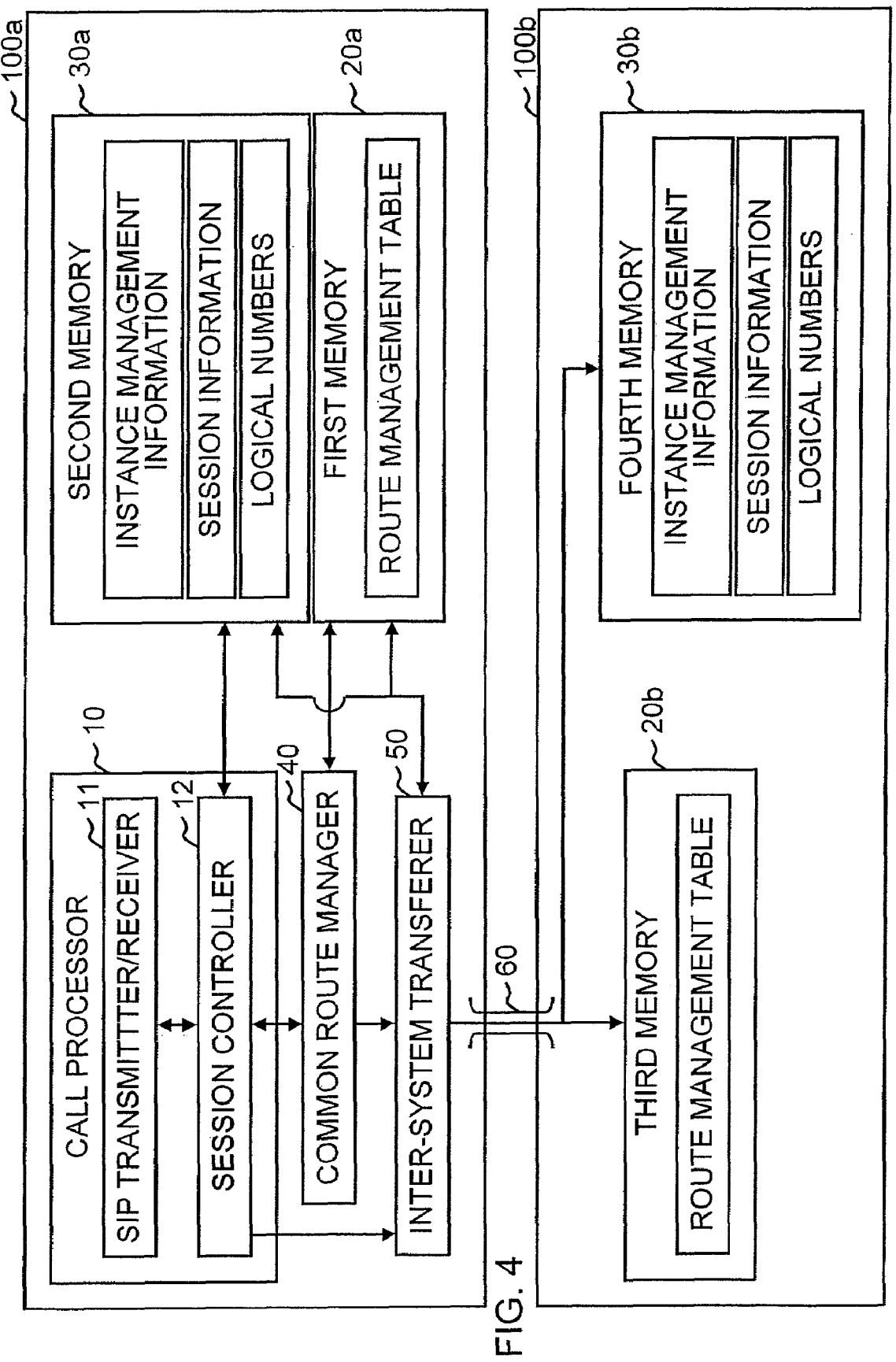
FIG. 4 is a block diagram illustrating a system configuration of a SIP server according to a second embodiment of the present invention.
Figure 5:
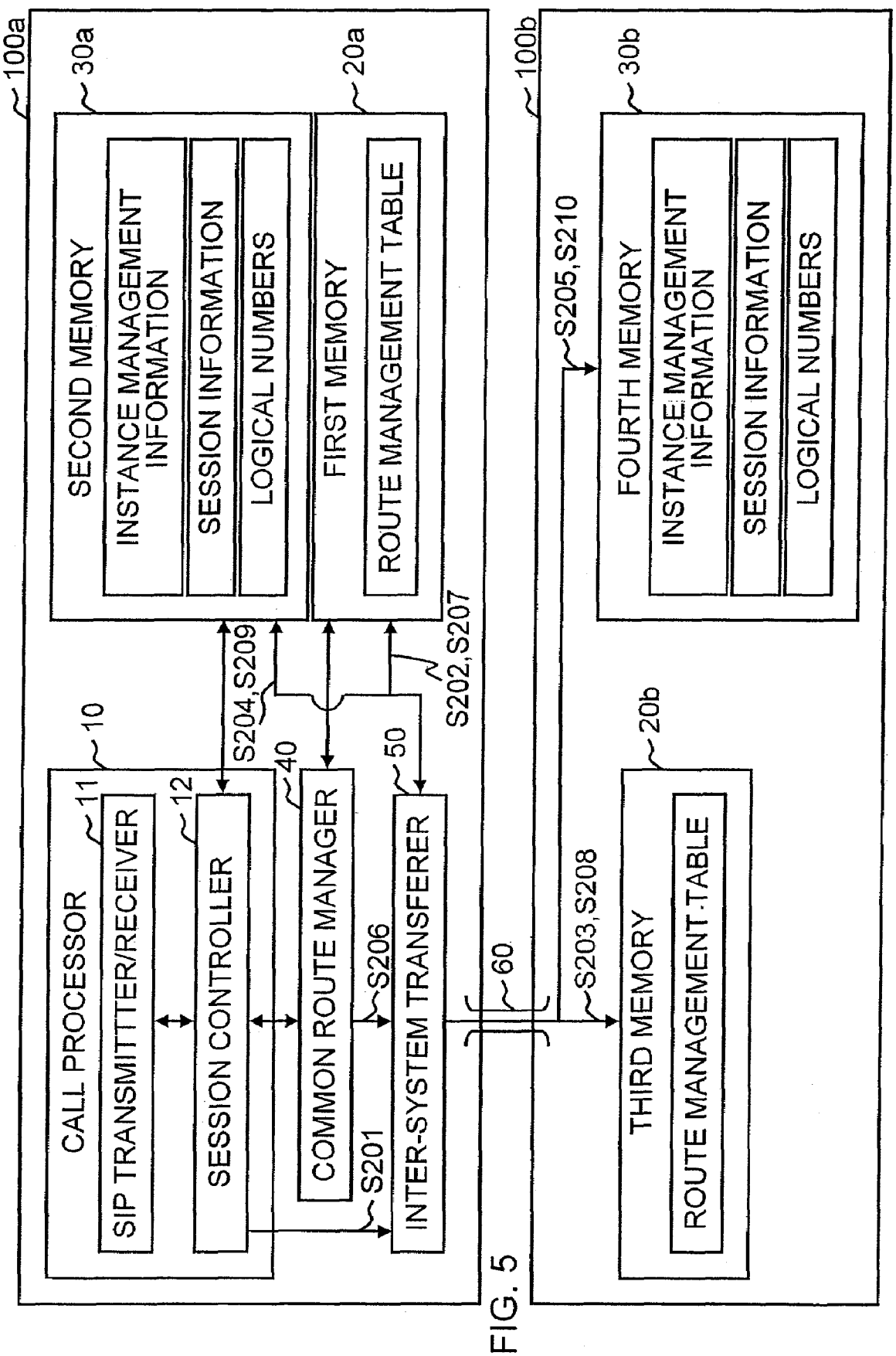
FIG. 5 is a block diagram illustrating a procedure of transferring route set information between systems (ACT-SIP server and SBY-SIP server) performed by the SIP server shown in FIG. 4.
Figure 6:
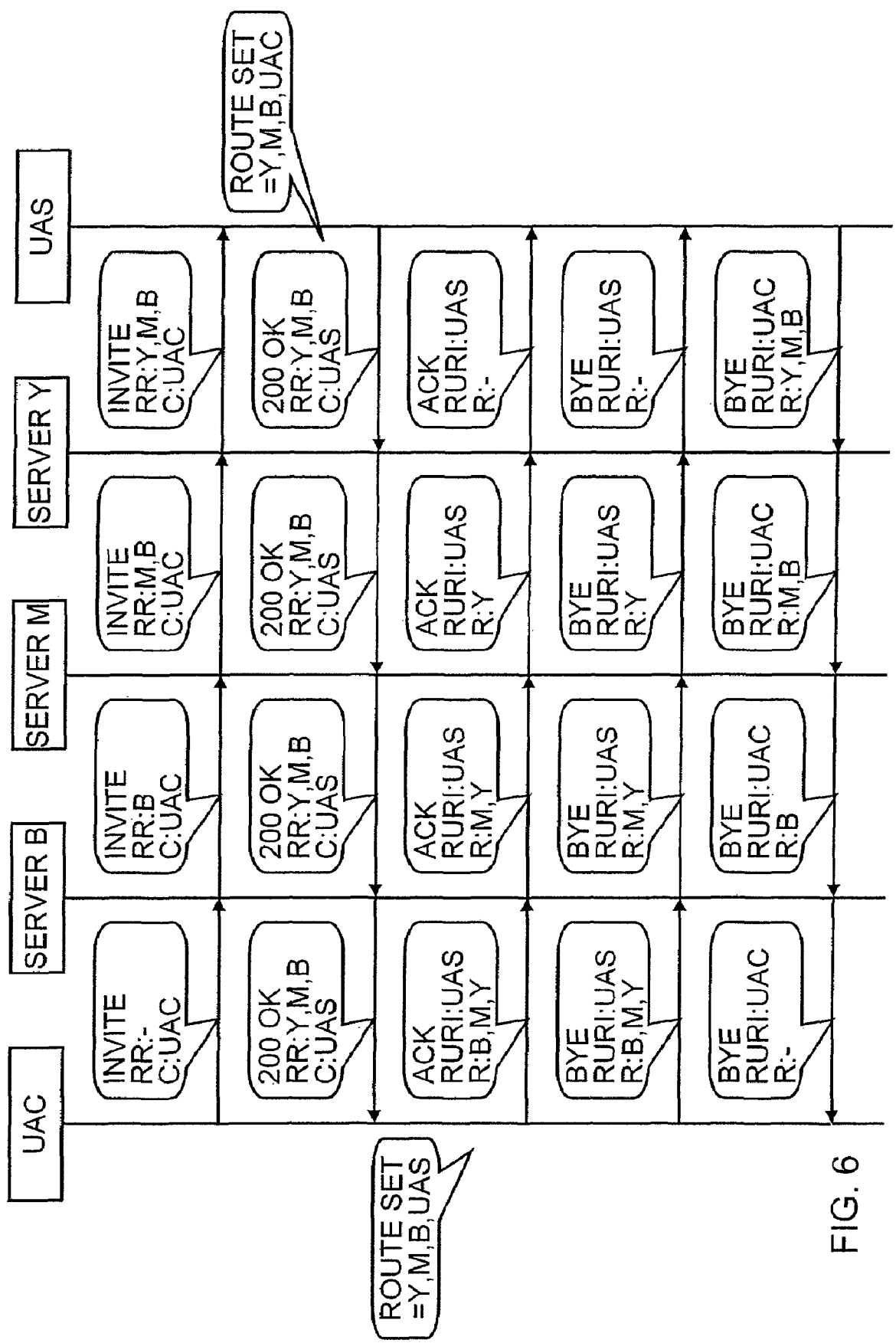
FIG. 6 is a sequence diagram illustrating an exemplary message sequence for describing information regarding a route set in compliance with RFC 3261.

FIG. 4 is a block diagram illustrating a system configuration of a SIP server according to a second embodiment of the present invention. FIG. 5 is a block diagram illustrating a procedure of transferring route set information between systems (ACT-SIP server and SBY-SIP server) performed by the SIP server shown in FIG. 4. Referring to FIGS. 4 and 5, the same reference numerals with that in FIGS. 1 to 3 denote the same or corresponding parts, and descriptions thereof are omitted.

The SIP server 100 is a redundantly configured server (ACT/SBY server) configured to transmit/receive information via a local area network (LAN) 60 between an ACT-SIP server 100a and an SBY-SIP server 100b.

A third memory 20b is a storage for storing a route management table having the same data structure as the above-described route management table stored in a first memory 20a.

A fourth memory 30b is a storage for storing session information, instance management information, and logical numbers having the same data structures as the above-described session information, instance management information, and logical numbers stored in a second memory 30a.

An inter-system transferer 50 is transfer processing means for, in response to a memory transfer request issued from the session controller 12, transferring and writing the route management table stored in the first memory 20a into the third memory 20b and transferring and writing the session information, instance management information, and logical numbers stored in the second memory 30a into the fourth memory 30b.

Regarding the SIP server according to the second embodiment, the point that the SIP server 100 is a redundantly configured server (ACT/SBY server) is the only difference from the first embodiment, and the SIP server according to the second embodiment has the same advantages as those achieved in the first embodiment except for advantages achieved by using the third memory 20b, the fourth memory 30b, and the inter-system transferer 50 described later.

In case of a failure in the ACT-SIP server 100a, the SIP server 100 managing the IP telephony switches from the ACT-SIP server 100a to the SBY-SIP server 100b. In such a case, it is necessary for the SBY-SIP server 100b serving as a new ACT-SIP server to rescue sessions. Therefore, the inter-system transferer 50 transfers the memory contents required for rescuing sessions from the ACT-SIP server 100a to the SBY-SIP server 100b before a failure occurs in the ACT-SIP server 100a.

A procedure of transferring route set information between systems (ACT-SIP server and SBY-SIP server) performed by the SIP server 100 will be described with reference to FIG. 5.

In a state where the above-described predetermined pieces of information are stored in the first memory 20a and the second memory 30a, the session controller 12 gives a transfer instruction to the inter-system transferer 50 in order to transfer, to the SBY-SIP server 100b, the route management table stored in the first memory 20a, session information including the route set information other than the address information as of each Record-Route header value and information necessary for other session control, instance management information for use in session control, and the logical number associated with the address information as of each Record-Route header value, which are stored in the second memory 30a (step S201).

The inter-system transferer 50 refers to the route management table stored in the first memory 20a (step S202), transfers the route management table to the SBY-SIP server 100b, and stores the route management table in the third memory 20b (step S203). The inter-system transferer 50 refers to the session information including the route set information other than the address information as of each Record-Route header value and other information necessary for session control, the instance management information for use in session control, and the logical number associated with the address information as of each Record-Route header value stored in the second memory 30a (step S204), transfers the referred information to the SBY-SIP server 100b, and stores the referred information in the fourth memory 30b (step S205).

In all sessions under control of the SIP server 100, the inter-system transferer 50 performs transfer procedure, that is, receiving memory transfer instructions, transferring information stored in specified memory areas to the SBY-SIP server 100b, and storing the transferred information in the corresponding third memory 20b or the fourth memory 30b of the SBY-SIP server 100b.

When address information as of a Record-Route header value has not been stored in the route management table stored in the first memory 20a yet, that is, the address information is new (when a logical number is assigned to new address information), the common route manager 40 sends a memory transfer request to the inter-system transferer 50 (step S206).

The inter-system transferer 50 refers to the new address information and its new logical number stored in the first memory 20a (step S207), transfers the referred information to the SBY-SIP server 100b, and stores the referred information in the third memory 20b (step S208). The inter-system transferer 50 refers to the new logical number (step S209), transfers the new logical number to the SBY-SIP server 100b, and stores the new logical number in the fourth memory 30b (step S210).

Even in the case where the configuration of the SIP server 100 according to the present invention is applied to a redundantly configured server as has been described above, the amount of memorized information transferred between systems (ACT-SIP server and SBY-SIP server) in the redundantly configured server can be reduced, and server congestion due to the inter-system memorized information transfer can be suppressed.

Next, the amount of memory necessary for the SIP server 100 according to the present invention for storing route set information in a network including the SIP server 100 is compared to the amount of memory necessary for a typical SIP server for storing route set information in a network including the typical SIP server.

The amount of memory necessary for the typical SIP server is calculated as, as described in the Description of the Related Art, (265 bytes×2+256 bytes×4)×100,000 sessions≈154 Mbytes. That is, a total of 154-Mbyte memory is necessary.

In contrast, it is assumed that the SIP server 100 according to the present invention, which allows simultaneous connections of 100,000 sessions, uses four Record-Route headers per session, and the size of one address data is 256 bytes, which is the typical size of the address data. It is also assumed that there are a maximum of thirty-two servers serving as routes in the network. In this case, the amount of memory necessary for managing entire route set information in the SIP server 100 is (Contact header×2+Record-Route header (logical number)×4)×the maximum number of simultaneous connections+(size used by the common route manager 40 (size used for each server×the number of servers)), which is calculated as (265 bytes×2+1 byte×4)×100,000 sessions+(256 bytes×32 servers)≈52 Mbytes. That is, a total of 52-Mbyte memory is necessary.

Therefore, the memory usage of approximately 100 Mbytes can be reduced, compared to the typical SIP server.

For example, in the case of the SIP server 100 realizing one million Busy Hour Call Attempts (BHCA; the total of session calls attempted at the busiest hour where the telephone network is most congested), the inter-system transfer amount of one Gbytes per hour can be reduced, thereby alleviating the cause of deterioration of the performance due to storing route set information in the SIP server 100.

What is claimed is:

1. A server system for transferring a communication message in a communication session, the server system being connected to a communication network, the server system comprising:

a first server to
store, in a first storage, a logical number and address information of a proxy server connected to the communication network;
in association with each other,
receive a first communication message including first address information of a first proxy server, generate first session information for controlling a first session corresponding to the received first communication message, extract the first address information included in the received first communication message, retrieve a first logical number from the first storage on the basis of the extracted first address information, and store, in a second storage, the retrieved first logical number and the generated first session information in association with each other.

2. The server system of claim 1, wherein the first server further extracts a second logical number from the second storage, retrieves second address information from the first storage on the basis of the extracted second logical number, and generates a second communication message including the retrieved second address information.

3. The server system of claim 1, further comprising:

a second server to copy information stored in the first storage to a third storage, and information stored in the second storage to a fourth storage.

4. The server system of claim 1, wherein the communication session is a SIP session, the first communication message is an INVITE request, and the first address information is a header value of a Record-Route header.

\* \* \* \* \*